United States Patent [19]

Adams et al.

[11] 4,281,817

[45] Aug. 4, 1981

[54] DISC VALVE

[75] Inventors: Horst Adams, Bochum-Stiepel; Rudolf Koenen, Herne, both of Fed. Rep. of Germany

[73] Assignee: Gebruder Adams Armaturen u. Apparate GmbH & Co. K.G., Bochum, Fed. Rep. of Germany

[21] Appl. No.: 189,270

[22] Filed: Sep. 22, 1980

Related U.S. Application Data

[63] Continuation of Ser. No. 954,052, Oct. 23, 1978, abandoned.

[30] Foreign Application Priority Data

Mar. 10, 1978 [DE] Fed. Rep. of Germany ....... 2810373

[51] Int. Cl.³ .............................................. F16K 1/226
[52] U.S. Cl. .................................... 251/305; 251/306
[58] Field of Search ................................ 251/305, 306

[56] References Cited

U.S. PATENT DOCUMENTS

| | | | |
|---|---|---|---|
| 3,025,035 | 3/1962 | Swain | 251/306 |
| 3,442,488 | 5/1969 | Adams | 251/305 |
| 3,591,133 | 7/1971 | Miles | 251/306 |
| 3,608,861 | 9/1971 | Helman | 251/306 |
| 3,698,686 | 10/1972 | Williams | 251/306 |
| 3,801,066 | 4/1974 | Miles et al. | 251/306 |
| 3,834,663 | 9/1974 | Donnelly | 251/306 |
| 4,003,394 | 1/1977 | Adams | 251/306 |
| 4,114,856 | 9/1978 | MacAfee et al. | 251/306 |

FOREIGN PATENT DOCUMENTS

| | | | |
|---|---|---|---|
| 1914357 | 10/1969 | Fed. Rep. of Germany | 251/306 |
| 1926635 | 6/1971 | Fed. Rep. of Germany | 251/305 |
| 2396907 | 3/1979 | France | 251/306 |

*Primary Examiner*—H. Jay Spiegel
*Attorney, Agent, or Firm*—Townsend and Townsend

[57] ABSTRACT

A disc valve having a valve housing with a conduit therethrough and a seal ring mounted to the housing. A disc can be pivoted about a pivot axis that is offset from the main valve axis and perpendicular thereto between an open position and a closed position in which a seating surface of the disc contacts a sealing surface of the seal ring in a sealing plane that is perpendicular to the valve axis. The seating surface of the disc is a conically shaped surface that is concentric with the valve axis when the disc is in the closed position. At least a portion of the sealing surface of the seal ring at the intersection between the sealing surface and the sealing plane has the same conical shape. The seal ring can be deflected by moving the disc beyond the closed position to thereby increase the sealing pressure between them. The seal ring can be aligned with the seating surface of the disc by initially floatingly mounting the ring to the housing, then closing the disc to center the seal ring, and thereafter locking the seal ring to the housing in the centered position. Opposing faces of the disc are slanted relative to the axis of the conically shaped seating surface.

33 Claims, 4 Drawing Figures

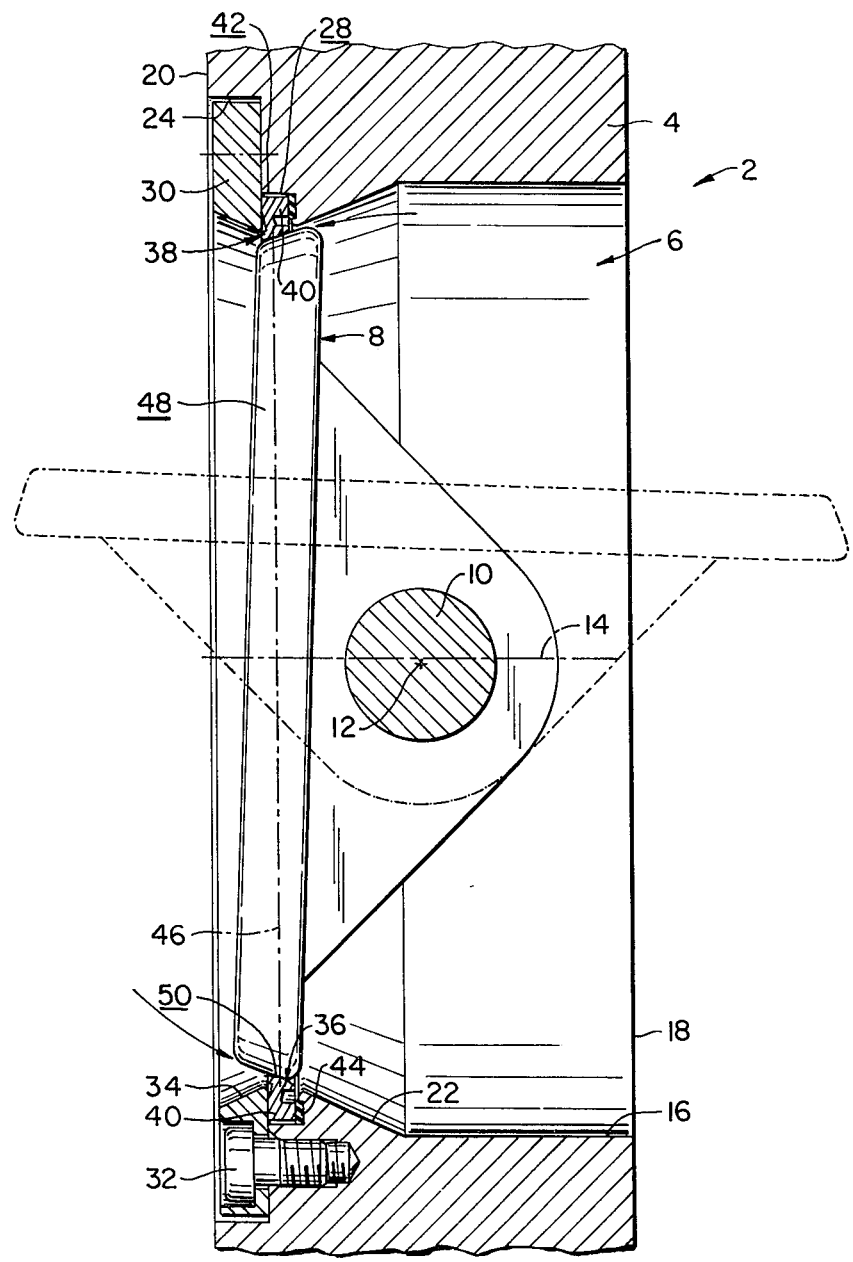
FIG._1.

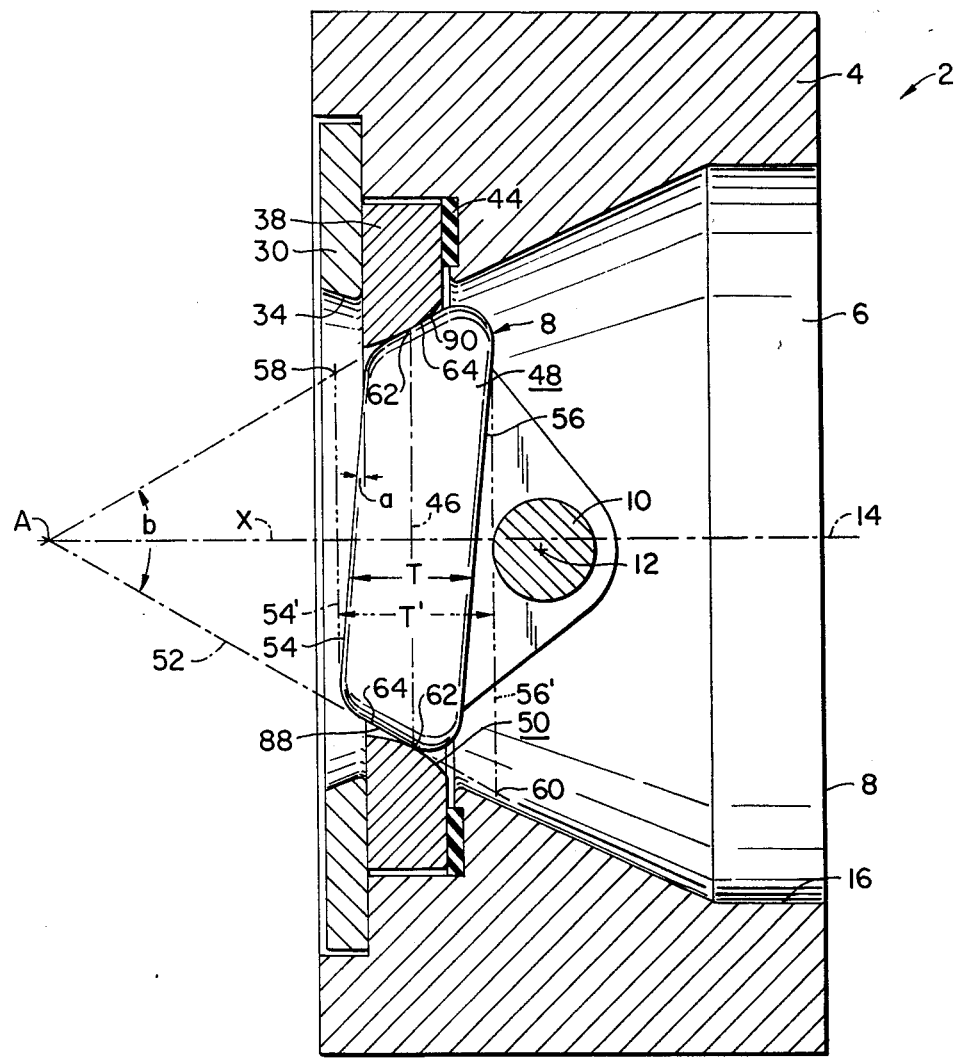
FIG._2.

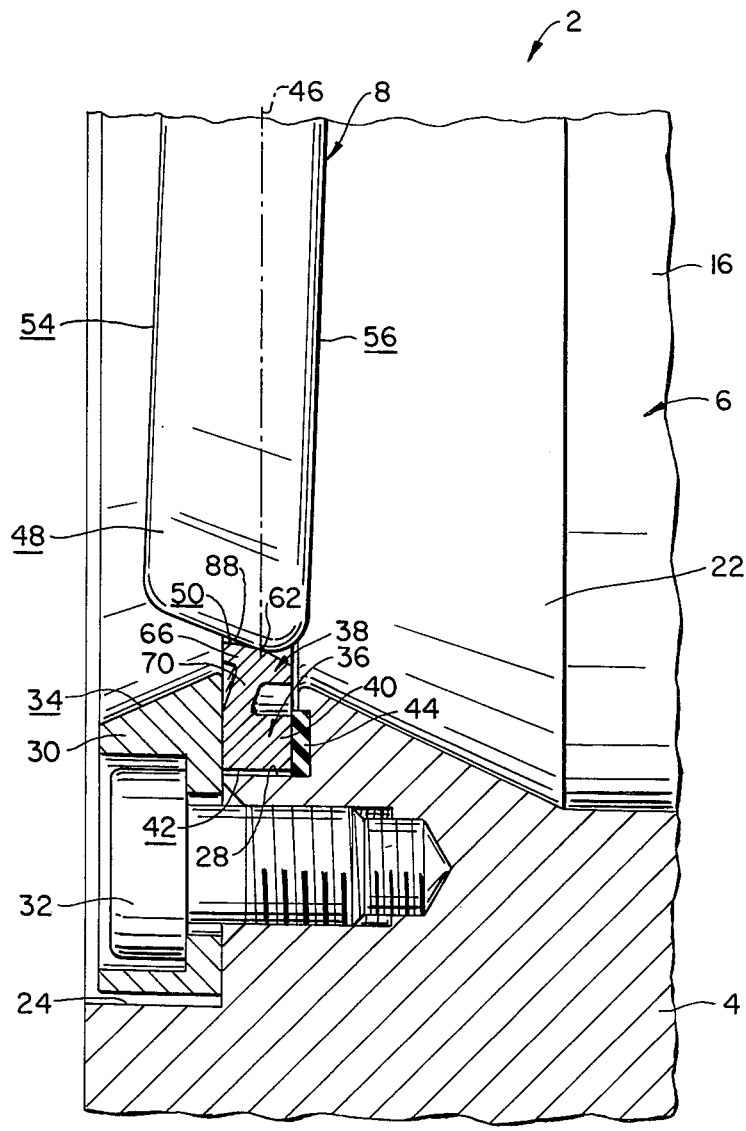
FIG._3.

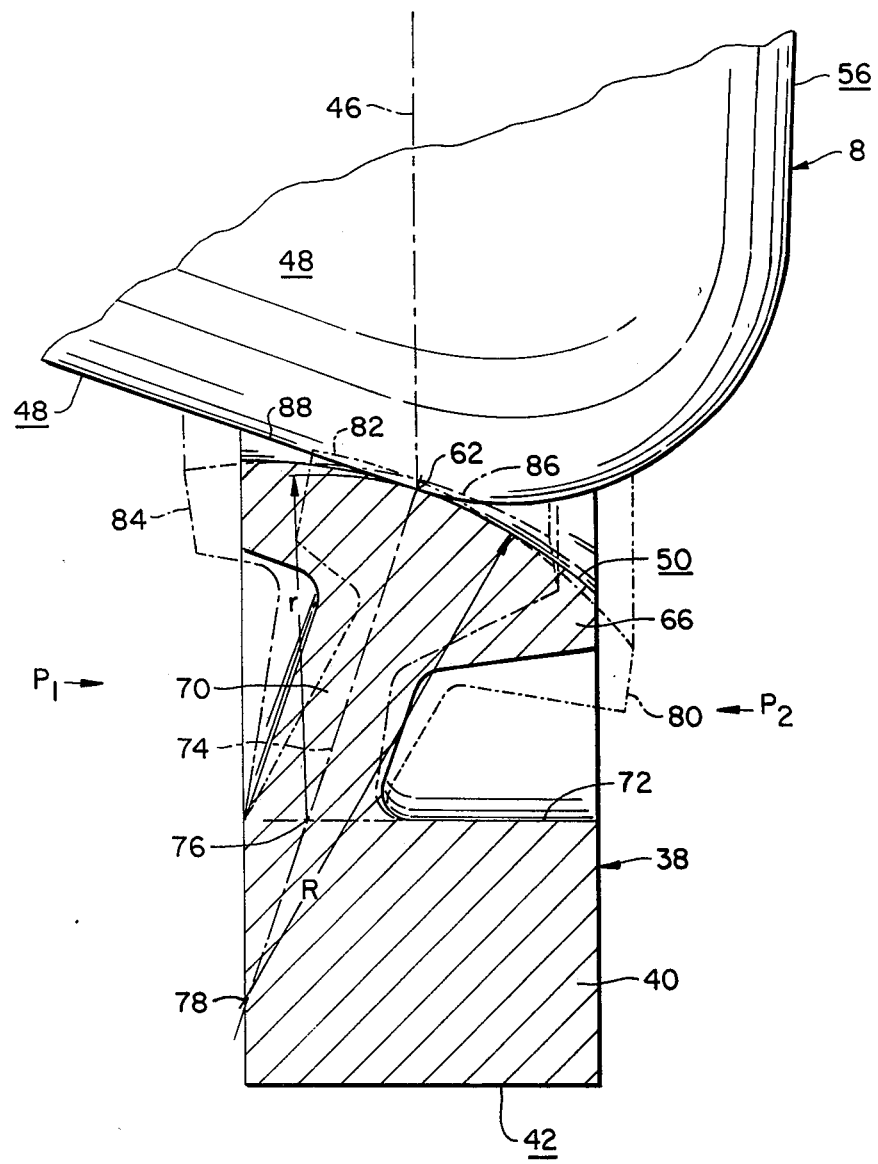
FIG._4.

DISC VALVE

This is a continuation of application Ser. No. 954,052, filed Oct. 23, 1978 is now abandoned.

BACKGROUND OF THE INVENTION

The present invention relates to disc or butterfly type valves in which a disc is pivotally disposed within a conduit of the valve defined by a generally cylindrical housing for pivotal movement of the disc between an open position, in which it is generally parallel to an axis of the valve, and a closed position in which the disc is generally perpendicular to the valve axis.

Disc valves as such are presently in wide use. The specific construction of such valves differs widely. One advantageous construction is disclosed and claimed in U.S. Pat. No. 3,442,488. The valve disclosed in that patent includes a disc fitted with a peripheral seal ring and rotatable about an eccentric axis for moving the seal ring into and away from sealing engagement with an internal sealing surface of an annular valve seat defined by the housing of the valve. The sealing surface is a conical surface whose axis forms an acute angle with the axis of the valve housing. An improvement to such a valve and in particular to the construction, alignment and operation of the sealing ring carried by its disc is disclosed in U.S. Pat. No. 4,003,394.

The valves disclosed in the above-referenced U.S. patents have yielded excellent operating results, that is they assure air tight seals under the most adverse operating conditions such as high fluid pressures and/or temperatures, high flow rates, the handling of chemically or mechanically abrasive fluids, etc., and they have enjoyed a corresponding commercial success. It is believed that the technological efficiency of such valves is at least in part the result of the particular sealing arrangement employed by them, especially the provision of an angularly offset (with respect to the valve axis) but otherwise conical seating surface in the valve housing and a correspondingly arranged seal ring in the disc which assured that the latter is wedged into sealing engagement with the former when the disc is tilted into its closed position. The wear of the seating surface and-/or of the seal ring from predominantly sliding engagement is thereby reduced or eliminated.

This advantageous operating characteristic of the valve, however, complicated its manufacture and required, for example, special jigs, tools, and machinery to accurately machine the angularly offset, conically shaped seating surface in the housing. This is particularly true for valves of relatively large diameter, say in the order of 24 inches or more where the cost of such jigs, tools, etc, can be a significant factor in the overall cost of the finished valve. Similar care had to be exercised in manufacturing the disc and the seal ring mounted therein. Thus such valves are not always as economical to manufacture as may be desired.

On the other hand, attempts to build disc valves with conical seal rings and seats that are coaxial with the valve axis have met only limited success. Although such constructions can sometimes be effective for low pressure, particularly in instances in which a perfect seal is not required, they have generally been ineffective for establishing air tight seals under adverse operating conditions since even the slightest degree of eccentricity can cause the loss of the seal. Further, such arrangements are effectively limited to disc valves in which the disc acts as a flap e.g., in which the disc is pivoted about a pivot axis that is located outside the seal ring diameter. Since such arrangements require a high operating torque for opening the disc against fluid pressure, they are only feasible for low pressure applications.

SUMMARY OF THE INVENTION

Generally speaking, the present invention provides a disc valve of the type described above, that is one which comprises a valve housing including a conduit through the valve and an eccentrically mounted, pivotal disc that is movable between an open and a closed position. Mounted to the housing is a seal ring which defines a sealing surface at least a portion of which lies in a plane (hereinafter sometimes referred to as the "sealing plane") that is perpendicular to the valve axis. Further, at least that portion has a conical shape which is coaxial with the valve axis (as defined by the properly centered seal ring).

A cooperating seating surface on the disc has a portion which has the same conical shape as the portion of the sealing surface at the sealing plane. The disc is sufficiently wide so that it can be moved beyond its closed position (in which the seating surface contacts the sealing surface at the intersection between the latter and the sealing plane), and in which the two portions of the sealing surface and the seating surface are in mutual alignment, to thereby increase the sealing pressure generated between the two surfaces and thus enhance the seal formed by the valve. To avoid a premature contact between the sealing surface of the seal ring in the housing and the seating surface of the disc, faces of the disc are slanted relative to the axis of the conically shaped portion of the seating surface.

A valve constructed as broadly outlined in the preceding paragraphs has the advantage that the housing is of an entirely concentric construction. Thus, the valve housing can be more readily manufactured with relatively simple machinery without requiring special jigs and tooling which take into account angular offsets as was the case with some of the earlier discussed prior art valves. The manufacture of the valve disc and seal ring is similarly simplified. Preferably a simple jig is provided for machining the disc while taking into account the slight slanting of the disc face. The seal ring is entirely perpendicular to its axis and therefore requires no jigs for its manufacture. As a consequence a valve constructed in accordance with the present invention can be made at a relatively lesser cost.

While the present invention provides significant economies in the manufacture of the valve, the operating characteristics of such a valve are excellent and they are further enhanced by constructing the seal ring so that a member thereof which defines the sealing surface can be resiliently deflected when the disc is moved beyond its closed position to increase sealing pressures and assure an air tight seal even under the adverse operating conditions such as high pressures, temperatures and difficult to handle fluid media.

In accordance with another aspect of the present invention, this is accomplished by constructing the seal ring so that it comprises an annular base, the above mentioned seal ring member and a web interconnecting the two. The base has a given width (in a radial direction) and thickness (in an axial direction) while the sealing member is spaced radially inward of the base and defines the radially inwardly facing sealing surface for engaging the seating surface of the disc. The web is constructed of a resilient material and interconnects the base with the sealing member. It extends in a generally radially inward direction from the base to the sealing member, but is slanted relative to the housing axis so that it is generally perpendicular to the conical surface defined by the above-mentioned portion of the sealing surface at the sealing plane. The web further has a thickness (in an axial direction) which is substantially less than the thickness of the base so that it can be resiliently deflected when an axially acting force is applied to it to thereby effect the above-mentioned deflection of the sealing surface.

Preferably, the cross-section of the sealing surface of the seal ring is curved, preferably arcuately curved (meaning circularly arcuate) having a radius of curvature which is greater, for example by a factor of 1.5:1, than the distance between the intersection of the sealing surface and the sealing plane and the intersection of the center of the web and the base of the seal ring. When so constructed, movement of the disc beyond the closed position causes the deflection of the seal ring along a circular path having its center at the intersection between the seal ring base and the web. Since the radius of curvature of the sealing surface exceeds the radius about which the sealing surface is deflected, the closure of the disc beyond the closed position result in an increased contact pressure between the sealing surface of the seal ring and the seating surface of the disc.

The effectiveness of the seal provided by a valve constructed in accordance with the present invention is further enhanced by an increase in the contact pressure between the seating surface and the sealing surface when the disc is in its closed position and the fluid pressure on either side of the disc is increased. The resulting pressure differential slightly deflects the sealing member of the seal ring, together with the web, in one or the other direction, again about the intersection between the web and the base (which is rigidly clamped to the housing). Such deflection of the sealing member, however, increases the surface contact and the contact pressure between the sealing surface and the seating surface of the disc thereby enhancing the seal and thus rendering the valve of the present invention effective for establishing an air tight seal even when it is subjected to high pressure differentials.

The contact pressure obtained with the valve of the present invention is thus not only a function of the force with which the disc is closed, that is with which the seating surface presses against the sealing surface due to their relative positions and dimensions, but is further a function of the pressure differential between the two sides of the closed disc. In other words, if the pressure differential increases the sealing force between the seal ring and the disc also increases, thereby assuring an air tight seal even at very high pressures without requiring the application of correspondingly larger forces to the disc when it is closed to mechanically generate the required contact pressure.

Thus, since it is not necessary to generate such high contact pressure with the closed disc and the associated actuating mechanism therefor, the pivot axis for the disc can be brought closer to the valve axis, thereby reducing the torque that is required for opening the disc against fluid pressure applied to one side thereof. In the past, it was frequently necessary to provide relatively large eccentricities for the disc pivot axis to facilitate the generation of the required, relatively high contact pressure between the disc and the seal ring. This had the adverse consequence, however, of correspondingly increasing the torque for operating the disc under pressure conditions. Since the present invention eliminates such requirements, it is now possible to operate the disc with pivot axis eccentricities of as little as 1 to 5 mm and normally no more than about 10 mm. This, in turn, enables one to provide smaller valve actuators which correspondingly reduces the overall costs of the valve.

To further reduce manufacturing costs, the requirement to maintain close tolerances, etc. the present invention contemplates to mount the seal ring in an inwardly opening groove defined by the housing which is dimensioned so that the seal ring can be adjusted, e.g. moved in a radial direction and by providing means such as a clamping ring for locking the seal ring in any desired relative position in the groove. The seal ring can be centered relative to the seating surface of the disc by loosening the clamping ring, closing the disc so that the seating surface engages the seal ring surface, whereby the seal ring is centered relative to the disc, and, thereafter, while the disc is in its closed position, tightening the clamping ring so as to lock the seal ring in its centered position. In this manner, the valve housing as well as the seal ring can be manufactured with relatively loose tolerance and manufacturing costs can be reduced while a perfect alignment between the seal ring and the cooperating seating surface of the disc is assured.

It is apparent that the present invention provides a disc valve which has operating characteristics and capabilities at least as good if not better than those exhibited by the highest quality prior art valves. In addition, the disc valve of the present invention exhibit the same sealing characteristics irrespective of whether the upstream or the downstream side of the valve disc only is pressurized. Yet, by virtue of the present invention, such a valve can be manufactured at a relatively low cost.

BRIEF DESCRIPTION OF THE DRAWINGS

FIG. 1 is a side elevational view, in section, of a valve constructed in accordance with the present invention and shows, in dotted lines, the disc of the valve in its open position;

FIG. 2 is a fragmentary, simplified side elevational view, in section, and illustrates the geometric relationships of the valve housing, the seal ring and the valve disc;

FIG. 3 is an enlarged, fragmentary, side elevational view which illustrates the sealing arrangement of the present invention in greater detail; and FIG. 4 is an enlarged, side elevational view, in section, illustrating in detail the seal ring cross-section and the deflection of the seal ring under axially acting forces.

DESCRIPTION OF THE PREFERRED EMBODIMENTS

Referring first to FIG. 1, a valve 2 constructed in accordance with the present invention generally comprises a valve housing 4 which includes a conduit 6 that extends through the housing. A valve disc 8 is disposed within the conduit and pivotally mounted thereto with a shaft 10 that is suitably journaled in the valve housing and that defines a pivot axis 12 for the disc for pivotally moving the disc between its open position, shown in dotted lines, in which the disc is generally parallel to a valve axis 14 and a closed position in which the disc is generally perpendicular to the valve axis as is more fully described hereinafter.

The conduit 6 includes a cylindrical section 16 which extends from a first end 18 of the housing towards a second end 20, an inwardly protruding, tapered section 22 which is disposed intermediate the housing ends, and a second cylindrical conduit section 24 of an enlarged outer diameter that terminates at the second housing end.

An annular recess is formed in the inwardly protruding section 22 of the housing, its radially outermost extent is defined by a cylindrical wall 28. A clamping ring 30 is positioned within the second cylindrical conduit section 24 and it is secured to the housing with a plurality of axially oriented bolts 32. Preferably, the clamping ring has a slanted inner wall 34 which slopes from the second housing end towards the annular recess 26 and which has an innermost diameter approximately equal to the innermost diameter of the protruding housing section 22. Thus, annular recess together with the portion of clamping ring 30 that extends beyond the cylindrical wall 28 define a radially inwardly open, annular groove 36 in the housing.

Disposed within groove 36 is a seal ring 38 which is constructed as is further described below. It has a base 40 that terminates in a radially outermost, cylindrical wall 42 of a diameter less than the diameter of groove wall 28 so that the seal ring can be adjusted in radial directions within the confines of the groove. For instances in which the seal ring is constructed of a metal or similar material, a gasket ring 44 may be placed between the seal ring base and the inwardly protruding section 22 of the housing so as to prevent the leakage of fluid therebetween when the disc is in its closed position and one or the other side of the disc is pressurized.

The operation of valve 2 illustrated in FIG. 1 can now be briefly summarized. When the valve is to be closed, a valve actuator (not separately shown) coupled to shaft 10 is energized to pivotally move disc 8 about pivot axis 12 in a counterclockwise direction, as indicated by corresponding arrows in FIG. 1, from the open position (shown in dotted lines) into the closed position in which the disc is oriented transverse to valve axis 14. In the closed position a sealing plane 46 defined by the theoretical line of contact between a seating surface 48 of the disc and a sealing surface 50 of the seal ring is perpendicular to the valve axis. To open the valve, the actuator is energized to pivot the disc in FIG. 1, in the opposite direction unit it is again substantially parallel to the valve axis.

Referring now to FIG. 2, the detailed construction, position and cooperation of seating surface 48 of disc 8 and sealing surface 50 of seal ring 38 are described. The seating surface 48 of disc 8 has a conical shape and it is selected so that when the disc is in the closed position, the apex "A" of the (seating surface) cone 52 (shown in dotted lines) is on valve axis 14 and the axis "X" of the cone is coaxial, that is coincides with valve axis 14. Further, the disc is given an excess thickness "T" (measured parallel to cone axis "X") and disc end faces 54, 56 are slanted by an angle "a" of between 1° and 10° and preferably of no more than about 5° relative to a plane which is perpendicular to the housing axis "X".

The ends faces 54, 56 of the disc are normally substantially parallel with respect to each other and they are slanted so that slant angle "a" lies in a plane that includes cone axis "X" and is perpendicular to pivot axis 12. Further, the slant angle is chosen so that the end faces slope away from the (counterclockwise) pivotal closing movement of the disc as is clearly illustrated in FIG. 2 to avoid a premature contact between the disc and the seal ring. Such premature contact would take place if the end faces were perpendicular to cone axis "X" as is indicated in FIG. 2 in dotted lines and identified with reference numerals 54' and 56', respectively.

If the end faces were not so slanted, the end faces and the seating surface 48 would meet at (imaginary) leading edges 58 and 60 (during movement of the disc from the open to the closed position in a counterclockwise direction). Since the distance from disc pivot axis 12 to imaginary leading edges 58, 60 is greater than the distance from the pivot axis to the intersection points 62 between sealing plane 46 and seating surface 48 (or sealing surface 50), the leading edges would contact the sealing surface before the disc is in its closed position. To avoid such contact the potential damage to the seal ring, the disc faces 54, 56 are slanted as above described to thereby in effect form recesses in perpendicular disc faces 54', 56' which avoid such premature contact. Moreover, the transition between the end faces and the seating surface is curved as is illustrated as a further precaution against such premature contact.

To facilitate and simplify the further discussion of the application herein, and to simplify claim terminology, the orientation of the slant angle "a" as above described will hereinafter be sometimes referred as a slant "angle trailing the closing motion of the disc" or as a "trailing slant angle".

The detailed construction of seal ring 38 is set forth later on. In its broadest form, however, it may have any cross-sectional profile so long as at least a portion of its sealing surface 50 at the intersection 62 between the sealing surface and the sealing plane 46 has the same conical shape as the conical shape of seating surface 48 of disc 8 at these points. In a preferred embodiment of the invention, such conically shaped portion is defined by a curved sealing surface which, at point 62, has a tangent that defines over the full circular extent of the seal ring a tangent cone. The tangent cone is the same cone as the cone of which seating surface 48 is a part. Further, the tangent cone has the same orientation as the cone for the seating surface when the disc is in its closed position. Thus, the tangent cone, like the cone defined by the seating surface has an apex "A" on valve axis 14 and a cone axis "X" which is coaxial with the valve axis.

It should also be noted that the seating surface 48 of disc 8 and the sealing surface 50 of seal ring 38 are constructed and arranged so when the disc is in its closed position sealing plane 46 intersects the conical seating surface but is otherwise immediately adjacent the (proximate) end face 54 (upper half of disc in FIG. 2) and 56 (lower disc half) and the curved transition between the respective end faces and the seating surface. Thus, there is an additional width of seating surface, identified with reference numeral 64, which is available for contacting the sealing surface of the seal ring. In other words, the seating surface is given an additional width thickness over what is theoretically necessary to establish a seal. By slanting the end faces in the above-discussed manner the additional width is provided without correspondingly increasing the thickness of the disc (to "T"). The additional seating surface width 64 allows one to increase the contact pressure between the disc and the seal ring as is more fully described below.

Referring now to FIGS. 3 and 4, the construction of seal ring 38 and its cooperation with valve disc 8 are described in detail. Generally speaking, the seal ring may have a variety of cross-sections, for example, it may have the cross-section shown in FIG. 2, and its seal rings surface 50 may have varying configurations so long as it defines the above-described conically shaped sealing surface at least at the intersection between the sealing surface and sealing plane 46. Therefore, the sealing surface may, for example, have a conical shape complementary to that of seating surface 48. One aspect of the present invention, however, contemplates to give the sealing surface in cross-section, a convex, arcuately curved shape. Furthermore, the sealing surface is defined by a sealing member 66 of the seal ring which is deflectable under axially acting pressure.

Structurally, the cross-section of the seal ring comprises the above mentioned generally rectangular seal ring base 40 which has a width and a thickness so that the base is compressed in seal ring groove 36 when clamping ring 30 is tightened to prevent the leakage of fluid between the seal ring base and the valve housing 4. If a gasket 44 is used the thickness of the base is such that it slightly exceeds the distance between the opposing faces of the gasket and the clamping ring.

Joined to the base is a generally radially inwardly extending web 70 which has a thickness (in the axial direction) substantially less than the thickness of the base so as to render the web relatively flexible. Further, the web is slanted so that it is generally perpendicular to the tangent at the intersection between seal ring surface 50 and sealing plate 46. Expressed in other words, the web is perpendicular to seating surface 48 of the disc when the disc is in its closed position. Lastly, in crossssection the sealing member 66 extends generally prpendicular to the web to either side thereof, somewhat akin to the flange of an I-beam, for example.

Particularly for high temperature applications the seal ring is constructed of a resiliently deformable metal such as steel, stainless steel, berylium copper or the like. For such applications it is necessary to provide gasket 44 to prevent fluid leakage past the base. For low temperature applications, say for applications in which the maximum temperature does not exceed 150° C. the seal ring may also be constructed of an elastomeric material such as plastic, rubber or the like of the desired hardness. In such instances, it is normally not necessary to provide a separate gasket 44 since the tightened clamping ring 30 provides sufficient pressure between the seal ring base and the housing to prevent fluid leakage past them. In both instances the base, the web and the sealing member are preferably integrally constructed.

The radial width of base 40 is selected so that the intersection between the (imaginary) extension of its radially inwardly facing, cylindrical surface 72 with a center line 74 of the web (which is perpendicular to the conical seating surface at point 62) defines a center of deflection 76 for sealing member 66 and web 70 that is spaced from sealing point 62 a distance "r". Further, sealing surface 50 is convexly arcuately shaped about a center point 78 which lies on a straight line extension of web center line 74 and which is spaced from sealing point 62 a distance "R" which is greater than "r", preferably by a factor of at least about 1.5:1.

The seat ring 38 constructed as above described assures that the contact pressure generated at sealing point 62 between disc seating surface 48 and ring sealing surface 50 can be increased by moving the disc beyond its closed position. The contact pressure further increases as a function of the pressure differential that may act on the seal ring when the disc is closed whether the pressure differential acts from one side or the other of the seal ring. This results from the fact that the relatively thin and, therefore, flexible web is connected to the rigidly clamped seal ring base 40 so that an axial force component will swing the web and, therewith, the sealing member 66 approximately above a circular path which is centered at point 76.

Thus, if pressure $P_1$ acts from the left, as illustrated in FIG. 4, disc 8 is closed and the opposite side is at a lower pressure, say at atmospheric pressure, the forces applied against the lefthand side of sealing member 66 and web 70 force the two to the right along a generally circular path having its center at point 76 and into the position shown in FIG. 4 in dotted lines and identified with the reference numeral 80. Since the radius of curvature "R" of sealing surface 50 is greater than the swing radius "r" of the sealing member, a lefthand portion 82 (as seen in FIG. 4) of sealing surface 50 moves radially inward as is indicated by the dotted lines in FIG. 4. In actuality such a radial movement of the sealing member is prevented by the closed disc 8; instead, the sealing member and the web are moved slightly to the right and resiliently compressed, thereby correspondingly increasing the contact pressure between seating surface 48 and sealing surface 50 as a function of the magnitude of the pressure differential sides generated by $P_1$.

Accordingly, the greater the pressure differential, which normally increases the danger of a resulting leak between the seal ring and the valve disc, the greater is the contact pressure between the two, thereby preventing such leaks and assuring that the valve of the present invention maintains a complete seal irrespective of the pressure which it must seal off.

If the pressure differential acts from the right of the seal ring as seen in FIG. 4 by virtue of a fluid pressure $P_2$ which exceeds the pressure on the lefthand side of the ring, the same result is obtained. The pressure differential causes sealing member 66 and web 70 to swing to the left about point 76 into the position indicated by reference numeral 84. By virtue of the above described relationship between "R" and "r" the righthand portion of sealing surface 50 is theoretically moved radially inward as is indicated at 86. Since the disc blocks a radially inward motion, the contact pressure between the seal ring and the disc is again increased in the above described manner.

Lastly, the contact pressure between the disc and the seal ring can be increased by pivotally moving disc 8 about pivot axis 12 beyond its closed position, that is beyond the position in which cone axis "X" of the conically shaped sealing surface 48 is coaxial with valve axis 14, so that the apex "A" of the cone would fall below the valve axis and below point "A" as viewed in FIG. 2. This is accomplished by selecting the conical shape of seating surface 48 relative to the position of pivot axis 12 so that the distance from the pivot axis to the sealing point 62 (when the valve is in its normal, theoretically closed position) is less than the distance from the pivot axis to any of the points on the remaining width 64 of the seating surface, such as points 88 (FIGS. 2-4) and 90 (FIG. 2). If this condition is met, movement of the disc beyond its closed position will resiliently compress sealing member 66 and web 70, thereby increasing the contact pressure. Such movement of the disc beyond its closed position may be accompanied by a slight resilient deflection of the sealing member and the web in the direction in which the disc moves, thereby swinging the two about point 76 to the right (as seen in FIG. 4) which causes an additional increase in the contact pressure.

In presently preferred embodiments of the invention with an offset between pivot axis 12 and valve axis 14 of between 1 to 5 mm, a cone angle "b" (FIG. 2) in the range of between about 20° to 70° has yielded good results although under given circumstances the angle may exceed the stated range so long as the above condition is satisfied. For many applications the optimal angle is in the vicinity of about 40° and generally it can be observed that smaller diameter valves will have larger cone angles and vice versa because of the relative position of shaft axis 12 and, in the case of larger diameter valves, the need for limiting the thickness of the valve disc. Thus, in one example, a valve of a nominal valve diameter of 300 mm may have a cone angle "b" of approximately 34° while a valve of a nominal valve diameter of 600 mm may have a cone angle "b" of approximately 25°, the valves having an eccentricity between the valve axis and the pivot axis of 2 and 3 mm, respectively.

We claim:

1. In a disc valve of the type having a housing including a valve conduit defining a main axis of the valve, a seal ring carried by the housing and having a sealing surface, a valve disc defined by opposing, spaced apart end faces and a seating surface interconnecting the end faces and arranged for sealingly engaging the sealing surface of the seal ring when the disc is in its closed position, and means for pivotally moving the disc about a pivot axis which is offset from and perpendicular to the main valve axis between a closed position in which the seating surface engages the sealing surface and an open position in which the disc is generally parallel to the main valve axis, the improvement to the sealing surface and the disc comprising in combination: a sealing surface at least a portion of which defines a conical surface which is coaxial with respect to the main valve axis; the seating surface of the disc having a conical shape which includes the conical shape of said portion of the sealing surface and which is arranged so as to be co-axial with the main axis when the disc is in the closed position in which the sealing surface and the seating surface are in mutual contact in a plane perpendicular to the main valve axis; the disc including generally parallel faces which are slanted relative to the axis of the conically shaped seating surface by an angle which lies in a plane that is substantially perpendicular to the pivot axis and includes the main valve axis, the angle being further arranged so that it trails the closing motion of the disc to prevent a premature contact between the disc and the ring as the disc moves from its open into its closed position.

2. A valve according to claim 1 wherein the disc faces are slanted relative to the axis of the conically shaped seating surface by an angle of no more than about 5°.

3. A valve according to claim 1 wherein the sealing surface is convexly curved in the direction of the main valve axis, and wherein said portion of the sealing surface defining a conical surface is defined by the tangent to the sealing surface at the intersection between the sealing surface and the perpendicular plane.

4. A valve according to claim 1 wherein the sealing surface is arcuately curved and has a given radius of curvature "R", and wherein the means for resiliently deforming the sealing surface includes means permitting resilient movement of the sealing surface along a generally circularly shaped path having a radius "r" which is smaller than "R".

5. A valve according to claim 7 wherein the ratio between the "R" and "r" is at least about 1.5:1.

6. A valve according to claim 1 wherein the pivot axis is offset relative to the main valve axis by no more than about 10 mm.

7. A valve according to claim 6 wherein the pivot axis is offset relative to the main valve axis by between about 1 to about 5 mm.

8. A valve according to claim 1 wherein the seal ring is constructed of a resiliently deformable metal, and including gasket means between the seal ring and the valve housing for preventing the leakage of fluid media therebetween.

9. A disc valve comprising in combination: a housing including a seal ring which is concentric relative to an axis through the valve, the seal ring including a generally radially inwardly facing, convexly curved sealing surface defining a sealing plane that is perpendicular to the valve axis, the tangent to the sealing surface at the sealing plane being a conical surface which is coaxial with respect to the valve axis; a valve disc defined by spaced apart end faces and a conically shaped seating surface interconnecting the end faces, a portion of the seating surface intermediate the end faces having the same dimensions as the conical surface, the disc faces being substantially parallel and slanted relative to the axis of the conical seating surface by a slant angle of not substantially more than about 10°; and actuating means for moving the disc between an open position in which it is generally parallel to the valve axis and a closed position in which the seating surface contacts the sealing surface in the sealing plane the actuating means including means defining a pivot axis for the disc which is perpendicular to the valve axis and which is offset with respect thereto, the pivot axis extending perpendicular to the plane in which the slant angle lies and being positioned so that the slant angle trails closing motion of the disc; whereby additional seat ring width is provided to enable the movement of the disc beyond the closed position to increase the contact pressure between the seating and the sealing surfaces while preventing contact between them before the disc is in the closed position.

10. A valve according to claim 9 wherein the conical surface has an included angle of between about 20° to about 70°.

11. A valve according to claim 9 wherein the offset between the valve axis and the pivot axis is between about 1 mm to about 5 mm.

12. A valve according to claim 9 wherein the seal ring is constructed of a resilient material.

13. A valve according to claim 12 wherein the seal ring has a cross-section defined by a base having a width in a radial direction and a thickness in an axial direction; a sealing member spaced radially inward of the base and defining the convexly curved sealing surface; and web means interconnecting the base with the member, extending generally radially inward of the base, and having a thickness in an axial direction which is substantially less than the thickness of the base; whereby the movement of the disc beyond the closed position results in a resilient deflection of the sealing member and the web means through the application of an increased pressure between the sealing surface and the seating surface.

14. A valve according to claim 13 wherein the sealing surface has a convexly arcuate configuration.

15. A valve according to claim 14 wherein the web means defines a center line which is substantially perpendicular to the conical surface defined by the tangent to the sealing surface at the intersection thereof with the sealing plane; whereby the movement of the disc beyond its closed position causes a generally arcuate deflection of the web means and of the sealing surface about a point lying approximately on the center line.

16. A valve according to claim 15 wherein the sealing surface is arcuately curved and has a radius of curvature which is less than the radius of deflection of the web means and the sealing surface about said point.

17. A valve according to claim 16 wherein the base, the web means and the sealing member of the seal ring are integrally constructed.

18. A valve according to claim 17 wherein the seal ring is constructed of metal.

19. A valve according to claim 17 wherein the seal ring is constructed of an elastomeric material.

20. A valve according to claim 15 including means for adjustably mounting the seal to the housing comprising a groove defined by the housing, adapted to receive the seal ring and dimensioned to permit relative movement of the seal ring in a radial direction; and means for releasably locking the seal ring disposed in the groove to the housing in any desired relative position of the seal ring within the groove; whereby the locking means can be loosened to permit a centering of the seal ring in a radial direction relative to the seating surface of the disc and thereafter retightened to lock the seal ring in such centered position.

21. A seal ring for use with disc valves having a valve housing including means for positioning the seal ring within the housing, a valve disc including a seating surface for sealingly engaging a sealing surface of the ring, and means for pivotally moving the disc between an open position and a closed position in which the disc is substantially perpendicular to the valve axis and in engagement with the seal ring, the seal ring comprising: an annular base having a width in a radial direction and a thickness in an axial direction; a sealing member spaced radially inward of the base and defining a generally radially inwardly facing sealing surface having, in cross-section, a convexly arcuate profile of a radius "R" for engaging the seating surface of the disc; web means constructed of a resilient material and interconnecting the base with the member, the web means extending generally radially inward of the base and having a thickness in the direction of the valve axis which is substantially less than the thickness of the base; and means for causing the deformation of the member and the web means relative to the base along a generally circular path of a radius "r" when an axially acting force is applied to at least one of the members and the web means; and wherein "R" is greater than "r" and the circular path is arranged so that the force with which the sealing surface is biased against the seating surface is enhanced when the axially acting force is applied.

22. A seal ring according to claim 21 wherein the circular path and the arcuately shaped sealing surface have centers which lie on a straight line that intersects a theoretical contact point between the sealing surface and the seating surface.

23. A seal ring according to claim 22 wherein "R" is at least about 1.5 times "r".

24. A seal ring according to claim 22 wherein the straight line is perpendicular to the tangent to the arcuate profile at the theoretical contact point.

25. A seal ring according to claim 22 wherein the web means is substantially perpendicular to the tangent to the arcuate profile at the theoretical contact point.

26. A circular seal ring for cooperation with a conically shaped seating surface of a disc valve that is concentric with respect to a valve axis, the seal ring comprising in cross-section, a base having a width in a radial direction and a thickness in an axial direction; a slanted web protruding in a generally radial direction from the base having substantially parallel, generally axially oriented faces, and defining therebetween a slanted web center line which intersects a radially oriented surface of the base at a first point, the web further having a thickness which is substantially less than the thickness of the base so as to render it relatively flexible; and a sealing member protruding in a generally radial direction from an end of the web remote from the base, the sealing member terminating in a convex, arcuately shaped sealing surface extending in a generally axial direction and having a center of curvature at a second point which lies on the slanted web center line, the distance from the sealing surface to the first point being less than from the sealing surface to the second point, the base, the web and the sealing member being constructed of a resilient material.

27. A seal ring according to claim 26 wherein the base forms the radially outermost portion of the seal ring.

28. A seal ring according to claim 26 wherein the sealing surface faces in a generally radially inward direction.

29. A seal ring according to claim 26 wherein the center line of the web is perpendicular to the tangent to the sealing surface at the intersection between the sealing surface and the center line.

30. A seal ring according to claim 26 wherein the base, the web and the sealing member are integrally constructed.

31. A disc valve comprising in combination: a valve housing; a seal ring which is concentric relative to an axis through the valve, the seal ring including, in cross-section, a base having a width in a radial direction and a thickness in an axial direction; a slanted web protruding in a generally radially inward direction from the base and having substantially parallel, generally axially oriented faces defining therebetween a slanted web center line which intersects a radially inwardly oriented surface of the base at a first point, the web further having a thickness which is substantially less than the thickness of the base so as to render it relatively flexible, and a sealing member protruding in a generally radially inward direction from an end of the web remote from the base, the sealing member terminating in a convex, arcuately shaped sealing surface extending in a generally axial direction and having a center of curvature which lies on the slanted web center line, the distance from the sealing surface to the first point being less than the distance from the sealing surface to the center of curvature, the web center line being further substantially perpendicular to a tangent to the sealing surface at the intersection between the sealing surface and the center line, the tangent defining over the full extent of the seal ring a tangent cone which is coaxial with the valve axis and which has a cone angle in the range of between about 20° to about 70° the intersection between the web center line and the sealing surface over the full extent of the seal ring defining a sealing plane for the valve which is perpendicular to the valve axis; a valve disc having spaced apart end faces and a conically shaped seating surface interconnecting the end faces and arranged for engaging the sealing surface of the seal ring at least in the sealing plane when the disc is in its closed position, conically shaped seating surface being co-axial with the valve axis when the disc is in its closed position and further having the same cone angle as the tangent cone; and means for pivotally moving the disc about a pivot axis between a closed position in which the seating surface engages the sealing surface along the intersection between the sealing surface and the sealing plane and an open position in which the disc is generally parallel to the valve axis, the pivot axis being perpendicular to the valve axis and being offset with respect thereto by no more than about 10 mm; the end faces of the disc being slanted relative to the axis of the conically shaped seating surface by an angle of no more than about 5°, the angle lying in a plane that is perpendicular to the pivot axis and includes the valve axis and being further arranged so that it trails the closing motion of the disc, the spacing between the end faces being sufficiently large so as to permit pivotal movement of the disc beyond the closed position, such pivotal movement resulting in a slight misalignment of the axis of the conically shaped seating surface from the axis of the tangent cone to thereby induce a slight, circumferential, resilient compression of the sealing surface of the seal ring and to thereby enhance the contact pressure between the seal ring and the disc.

32. In a disc valve of the type having a housing including a valve conduit defining a main axis through the valve, a seal ring carried by the housing and having a sealing surface, a valve disc defined by opposing, spaced apart end faces and a seating surface interconnecting the end faces and arranged for sealingly engaging the sealing surface of the seal ring when the disc is in its closed position, and means for pivotally moving the disc about a pivot axis which is offset from and perpendicular to the main valve between a closed position in which the seating surface engages the sealing surface and an open position in which the disc is generally parallel to the main valve axis, the improvement to the sealing surface and the disc comprising in combination: a sealing surface at least a portion of which defines a conical surface which is coaxial with respect to the main valve axis; the seating surface of the disc having a conical shape which includes the conical shape of said portion of the sealing surface and which is arranged so as to be coaxial with the main valve axis when the disc is in the closed position in which the sealing surface and the seating surface are in mutual contact in a plane perpendicular to the main valve axis; the disc further having a spacing between its faces which is sufficiently large so as to permit pivotal movement of the disc beyond the closed position so as to slightly misalign the axis of the seating surface from the valve axis, the disc faces being generally parallel and slanted relative to the axis of the conically shaped seating surface by an angle which lies in a plane that is perpendicular to the pivot axis and includes the main valve axis, the angle being arranged so that it trails the closing motion of the disc, whereby a premature contact is prevented between the disc and the ring as the disc moves from its open to its closed position.

33. A seal ring for use with disc valves having a valve housing defining a main axis through the valve and including means for positioning the seal ring within the housing, a valve disc including a seating surface for sealingly engaging a sealing surface of the seal ring, and means for pivotally moving the disc between an open position and a closed position in which the disc is substantially perpendicular to the main valve axis and in engagement with the seal ring, the seal ring comprising: an annular base having a width in a radial direction and a thickness in an axial direction; a sealing member spaced radially inward of the base and defining a generally radially inwardly facing sealing surface for engaging the seating surface of the disc, the profile of the sealing surface having a convexly arcuate configuration; web means constructed of a resilient material and interconnecting the base with the member, the web means extending generally radially inward of the base and having a thickness in the direction of the main valve axis which is substantially less than the thickness of the base; the seal ring including means adapted to cause movement of the member and the web means along a generally circular path under an axially acting force, the circular path and the arcuately shaped seal ring surface having centers which lie on a straight line that intersects a theoretical contact point between the sealing surface and the seating surface; whereby the formation of a seal between the sealing surface and the seating surface can be enhanced by resiliently deflecting the member and the web means through the application of increased pressure between the sealing surface and the seating surface.

* * * * *